W. BROUGH.
DEVICE FOR TATTOOING ANIMALS.
APPLICATION FILED MAR. 15, 1911.
992,732. Patented May 16, 1911.
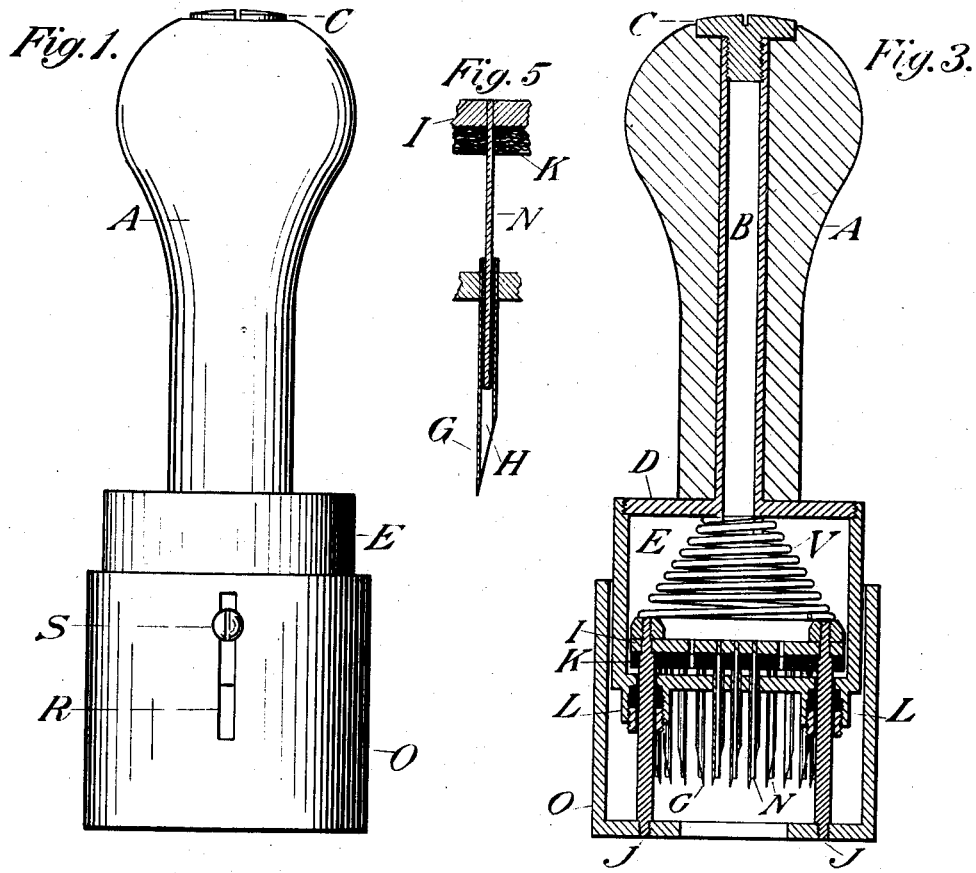
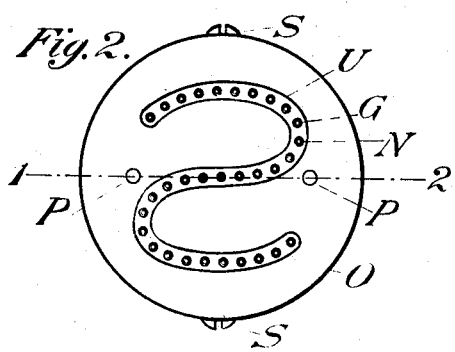
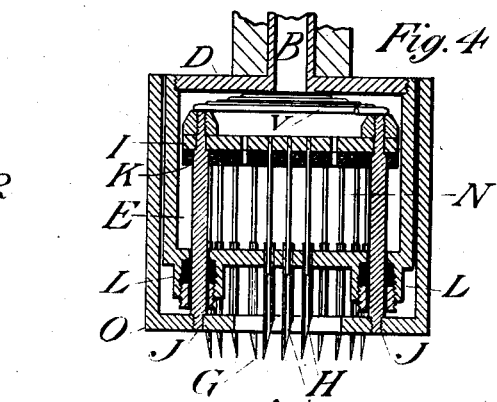

UNITED STATES PATENT OFFICE.

WILLIAM BROUGH, OF WASHINGTON, DISTRICT OF COLUMBIA.

DEVICE FOR TATTOOING ANIMALS.

992,732.  Specification of Letters Patent.  Patented May 16, 1911.

Application filed March 15, 1911. Serial No. 614,703.

(DEDICATED TO THE PUBLIC.)

*To all whom it may concern:*

Be it known that I, WILLIAM BROUGH, an employee of the Department of Agriculture of the United States of America, residing in the city of Washington, District of Columbia, have invented a new and useful Device for Tattooing Animals.

This application is made under the act of March 3, 1883, chapter 143 (22 Stat., 625), and the invention herein described and claimed may be used by the Government of the United States or any of its officers or employees in the prosecution of work for the Government or by any person in the United States without the payment of any royalty thereon.

My invention relates to a device for tattooing or marking animals.

The object of my invention is to provide a device that may be easily and conveniently operated and one which satisfactorily performs the function required for tattooing or marking animals. In certain industries of animal breeding the breeders brand their animals for the purpose of evidencing ownership or for affording a means by which pedigree may be traced. This method of branding animals for indentification is likewise practiced by rangers. My apparatus is particularly designed for use in marking animals for identification in these fields of industry. The mechanism can be constructed so that any mark or design may be tattooed on animals. My invention is also designed for use in marking cattle, sheep, swine and goats that are inspected under the provisions of the Meat Inspection Act of June 30, 1906. It is incumbent upon Government inspectors performing their duties under this law to thoroughly examine such animals prior to their slaughter in establishments operating under Federal supervision. If any of the animals referred to disclose or are suspected of having symptoms of any disease, then the inspectors are required to tag the animal so diseased, or suspected of being diseased, with a tag marked "U. S. Suspect." These animals are required to be set apart and slaughtered separately from the animals which have passed inspection. The tags attached to such animals can be easily lost or removed, thereby preventing the inspectors from readily discerning or recognizing the animals so tagged. This difficulty is obviated in employing my device for the purpose mentioned. The letters tattooed in the animals by the use of my invention are permanent and can be readily observed by the inspector at any time.

The nature, characteristic features and scope of the invention may be more readily understood from the following description, taken in connection with the accompanying drawings forming a part hereof, wherein—

Figure 1 is a side view of my invention; Fig. 2 is a face view of my device; Fig. 3 is a sectional view on line 1—2. Fig. 4 is a sectional view showing needles projecting; and Fig. 5 is a detail sectional view, showing construction of the needles.

A, represents a handle having a tube, B, extending longitudinally through its center. C is a cap or head employed for closing the top of said tube. To the handle, A, at its bottom end, is secured a disk or plate, D, having a threaded edge and an opening in its center for the admission of the tube, B. This disk, D, is used as a top or cover for the reservoir.

E, represents a reservoir having a series of holes or perforations in its bottom. These holes or perforations are employed for admitting the passage therethrough of a series of needles, G, provided with open ends at the top. The holes or perforations are cut or drilled in the bottom of the reservoir, E, in such a way that when the needles, G, are inserted therein, the said needles constitute the design or mark desired to be tattooed on animals. These needles are preferably made of steel, but any other suitable material may be employed in their construction. The top ends of said needles, G, are open in the center and said needles are provided with ducts, H, which ducts connect with the openings in said needle ends. The purpose of the openings in the needle ends and the ducts in said needles is to afford a channel for the ink or other fluid to flow through from the reservoir into the punctured parts of the animal when the apparatus is in operation, as will be more fully described hereinafter.

Within the reservoir, E, is a stationary disk or plate, I, supported by guide rods, J J, having threaded ends. This disk, I, is provided with a plurality of holes which afford openings for the ink contained in the reservoir to flow through into the ducts of the needles, G. Fastened to the bottom of the disk, I, is a piece of flexible rubber, K, which is used as a valve for the openings in the ends of the needles, G. This rubber valve, K, is perforated in places so as not to interfere with the flow of ink or other fluid when the device is in operation.

The bottom of the reservoir, E, is provided with two boxes, L L. These boxes, L L, have openings at both ends. These openings in said boxes are used as a passageway for the reservoir to slide forward and backward over the guide rods, J J, when the mechanism is in use. I also provide a series of stems, N, having their top ends securely embedded in the disk or plate, I, and said stems are so arranged that they represent the impression which the device is designed for making on animals. These stems, N, may be made of brass, steel, or other suitable material, and are so constructed that they are approximately of the same length of the needles, G, and can readily pass through said ducts, H. These stems, N, are stationary and secured to the disk, I, in such a manner that they enter said ducts when said needles slide over said stems upon returning to rest after an operation. When the apparatus is not in use said stems rest in and clog the ducts, H, thereby preventing the entrance therein of any foreign matter and choking up said ducts. If the device is in operation, said needles are partially withdrawn from said stems, as will hereinafter be more fully explained.

O, represents the cylinder or sleeve. This sleeve is provided with openings, P P, in its bottom, and is adjusted to the guide rods, J J, by means of the threaded ends of said guide rods passing through said openings, P P. This adjustment enables the reservoir, E, to slide forward and backward in said sleeve over the guide rods, J J. In order to effectually prevent said sleeve, O, from moving or rolling over the reservoir, E, I provide slotted openings, R R, on both sides of said sleeve and threaded openings on both sides of the reservoir, E, and pass through said slotted openings, R R, screws, S S, for engaging the threaded openings. The screws, S S, when so adjusted travel forward and backward in the slotted openings, R R, in response to the movement of the reservoir, E. The bottom of the sleeve, O, has the same design cut therein which the formation of the needles, G, represent. This cut or opening is designated, U, and is of sufficient width to permit the needles, G, to pass therethrough when the device is in operation.

Within the reservoir, E, is placed a spring, V. This spring rests on the disk, I, and is held in place by the disk, D. The purpose of said spring, V, is to return the reservoir to its normal position immediately upon removal of pressure from the handle, A.

The reservoir, E, and the sleeve, O, are preferably made of brass, but any other suitable metal or material such as iron, copper, steel, etc., may be used in their construction.

In practicing my invention I cut or drill in the bottom of the reservoir, E, a series of perforations. These perforations are drilled so as to form the figure, letter or design which the device is intended to represent. I then pass through said perforations the needles, G. These needles fit tightly in said holes and constitute the figure, letter or design. If said needles do not fit tightly in said perforations so as to prevent leakage they may be made tight by cementing or soldering the same to the reservoir. I then place in the reservoir, E, the disk, I, provided with a rubber attachment and supported by guide rods, J J, and having a plurality of stems, N, secured thereto, which are arranged so as to constitute the same figure, letter or design as the needles, G. Then I arrange boxes, L L, on the bottom of the reservoir and provide openings at both ends of said boxes and pass the guide rods, J J, therethrough. I then secure the stems, N, to the disk, I. These stems are adapted to pass through the rubber attachment, K, the needle ends, and the ducts, H. The spring, V, is then placed in the reservoir, E, above the disk, I, and the cover or top, D, secured to the handle, A, is adjusted by engaging its threaded edge with the threads of the inner portion of said reservoir. The cylinder or sleeve, O, is then attached by passing the threaded ends of the guide rods, J J, through the openings, P P, in the bottom of said sleeve. To more effectually secure the sleeve to the reservoir, I adjust the screws, S S, which are adapted to pass through the slots, R R, and engage with threaded openings on side of reservoir. When the parts are so constructed and arranged, it is then only necessary for the operator to remove the cap, C, and pour the ink or other fluid used for tatooing purposes through the tube, B, into the reservoir, E. After the reservoir is filled, the cap, C, is then replaced and the mechanism is ready for operation.

In operating my device, it is only necessary to place the cylinder or sleeve, O, against the animal at the place where it is desired to leave the mark or impression, and then press the handle forward. The cylinder or sleeve, O, being held in this position by the hand of the operator, becomes rigid, and the pressure on the handle, A, forces the reservoir, E, forward over the guide rods, J J, into the sleeve, O. The guide rods, J J, being stationary, hold the inner disk, I, in place. The reservoir being pushed forward also carries with it the needles, G. In this forward movement the needles are released from the stems, N. When said needles are forced forward in the sleeve, O, they pass through the opening forming the design cut in the bottom of said sleeve and pierce the flesh of the animal to be marked. As the ends of the needles are removed from the flexible rubber piece, K, which operates as a valve to the openings therein, and the ducts, H, freed of the stems, N, by this forward movement of the reservoir, the ink or fluid used for tattooing flows uninterruptedly through the openings in the disk, I, and the rubber piece, K, into the openings of the needle ends and through the ducts, H, into the punctured parts of the animal. After the operation is completed, the mechanism returns to its closed position automatically. This action is accomplished by means of the spring, V. When the handle is under pressure, the disk, D, bears upon this spring and presses it against the stationary inner disk, I, thus causing the said spring to contract. Upon removal of the pressure, the spring V, being released, automatically throws the handle and reservoir backward to their position of rest. The backward movement of the reservoir, E, carries the needles, G, full length over the stems, N, and the flexible rubber piece, K, again rests on the ends of the needles and prevents the fluid from flowing into the openings of said ends. The stems, N, clean out the ducts, H, as the stems return to rest.

The sleeve, O, is used as a cover for the needles in order to prevent injury to persons handling the apparatus.

Having thus described my invention, I claim:

1. In a tattooing device, comprising a handle, a reservoir for holding fluid for tattooing, a disk secured to said handle and adapted to cover said reservoir, said reservoir having a plurality of holes drilled in its bottom in the form of a design, needles having ducts and provided with open ends for entering said holes and representing said design, a stationary disk within said reservoir having openings therein and supported by guide rods with threaded ends, a flexible rubber piece attached to the bottom of said stationary disk and operating as a valve to said needle ends, perforations in said rubber piece, boxes formed in the bottom of said reservoir provided with openings and arranged for the admission of said guide rods therethrough, stems rigidly secured to the said stationary disk in the form of the design said needles represent, a spring within said reservoir resting on said stationary disk, a sleeve having an opening formed in its bottom the shape of the design said needles constitute, openings in the bottom of said sleeve for the reception of the threaded ends of said guide rods, threaded caps for engaging said threaded ends and adjusting said sleeve and reservoir in a fixed operative position for use in tattooing animals, substantially as specified.

2. In a device for tattooing animals, comprising a handle, a tube centrally located in said handle and extending lengthwise therein, a cap for closing said tube, a disk secured to the bottom of said handle having an opening in its center for the reception of said tube, a reservoir for holding tattooing fluid passed through said tube, said reservoir having its inner top portion threaded, said disk having a threaded edge for engaging the threaded part of said reservoir, said reservoir having a series of perforations cut in its bottom in the form of a design, needles having ducts and provided with ends having openings for entering said perforations and fixedly representing said design, a stationary disk within said reservoir having a flexible rubber attachment at its bottom operating as a valve for said needle ends, a series of openings in said stationary disk and a plurality of perforations in said rubber attachment, guide rods having threaded ends secured to and supporting said stationary disk, boxes having openings formed in the bottom of said reservoir, stems secured to said stationary disk and arranged in the form of the design said needles constitute, said stems extending through the ducts of said needles, a spring resting on the stationary disk within said reservoir, a sleeve having an opening formed in its bottom corresponding to the design represented by said needles, openings in the bottom of said sleeve for the reception of the threaded ends of said guide rods, threaded nuts for engaging said threaded ends and rigidly adjusting said sleeve and reservoir, said reservoir slidably arranged on said guide rods and adapted to respond to pressure by moving forward in said sleeve and forcing said needles forward clear of said stems through the design opening in the bottom of said sleeve, thereby forcing the needle ends from said rubber attachment and permitting an uninterrupted flow of tattooing fluid from said reservoir through the openings in said stationary disk and rubber attachment into and through said ducts, and automatically returning to a closed position upon the withdrawal of pressure, substantially as specified.

3. In a tattooing device, comprising a reservoir for holding tattooing fluid, a handle adjustably secured thereto, said reservoir having a series of drilled holes in its bottom in the form of a design, needles having ducts and provided with ends having openings for entering said holes, and fixedly representing said design, a stationary disk within said reservoir and a spring resting thereon, threaded openings in the sides of said reservoir, a sleeve having slotted openings in the sides thereof and an opening formed in its bottom in the shape of the design said needles represent, screws passing through said slotted openings and engaging said threaded openings, stems secured to said stationary disk and arranged to enter said ducts, guide rods supporting said stationary disk and adapted to pass through open boxes formed in the bottom of said reservoir, said guide rods having threaded ends, openings in the bottom of said sleeve for the reception of said ends, threaded nuts for engaging said threaded ends and securing the sleeve to said reservoir, said reservoir adapted to respond to pressure by sliding forward over the guide rods into said sleeve, thereby carrying said needles forward free from said stems, and permitting an uninterrupted flow of tattooing fluid into said ducts, and said reservoir being adapted to return automatically to a closed position upon the withdrawal of pressure, substantially as specified.

4. In a tattooing device, comprising a reservoir for holding tattooing fluid, a handle adjustably secured thereto, said reservoir having a series of drilled holes in its bottom in the form of a design, needles having ducts and provided with ends having openings for entering said holes and fixedly representing said design, a stationary disk within said reservoir and a spring resting thereon, a sleeve having an opening formed in its bottom in the shape of the design said needles represent, stems secured to said stationary disk and arranged to enter said ducts, guide rods supporting said stationary disk and adapted to pass through open boxes formed in the bottom of said reservoir, said guide rods having threaded ends, openings in the bottom of said sleeve for the reception of said ends, threaded nuts for engaging said threaded ends and securing the sleeve to the reservoir, said spring adapted to contract in response to pressure on said handle, said reservoir responding to such pressure by traveling forward over said guide rods and carrying said needles forward beyond said stems, said spring forcing said reservoir backward to a closed position upon release of pressure, said needles returning with the backward movement of said reservoir and covering said stems, thus causing the stems to clean said ducts, which said device is adapted for tattooing animals, substantially as specified.

In testimony whereof, I affix my signature in the presence of two subscribed witnesses.

WILLIAM BROUGH.

Witnesses:
Wm. H. Smith, Jr.,
Marcus W. Kling.